(12) United States Patent
Johnson

(10) Patent No.: US 8,240,118 B1
(45) Date of Patent: Aug. 14, 2012

(54) COMBINATION OF HAY RAKE AND BALER WITH HAY DEFLECTOR AND METHOD

(76) Inventor: Mark A. Johnson, Troy, AL (US)

( * ) Notice: Subject to any disclaimer, the term of this patent is extended or adjusted under 35 U.S.C. 154(b) by 0 days.

(21) Appl. No.: 13/200,746

(22) Filed: Sep. 30, 2011

(51) Int. Cl.
*A01D 76/00* (2006.01)
*A01D 78/00* (2006.01)
*A01D 80/00* (2006.01)
*A01D 84/00* (2006.01)

(52) U.S. Cl. .................................................. 56/368

(58) Field of Classification Search .............. 56/368, 56/377, 376, 370
See application file for complete search history.

(56) References Cited

U.S. PATENT DOCUMENTS

| | | | |
|---|---|---|---|
| 3,237,390 A * | 3/1966 | Murphy | 56/376 |
| 3,788,053 A * | 1/1974 | Bonnett | 56/399 |
| 4,182,103 A * | 1/1980 | McNutt | 56/364 |
| 4,753,063 A * | 6/1988 | Buck | 56/377 |
| 5,155,986 A * | 10/1992 | Kelderman | 56/365 |
| 5,404,702 A | 4/1995 | Lewis | |
| 5,685,135 A | 11/1997 | Menichetti | |
| 6,105,354 A | 8/2000 | Luhn et al. | |
| 6,467,249 B2 * | 10/2002 | Demanet | 56/377 |
| 6,834,488 B2 | 12/2004 | Menichetti | |
| 7,100,351 B2 | 9/2006 | Rowse | |
| 7,318,312 B2 | 1/2008 | Cicci et al. | |
| 7,367,175 B2 | 5/2008 | Scott | |
| 2002/0059790 A1 | 5/2002 | Paulsen | |
| 2003/0233820 A1 * | 12/2003 | Menichetti | 56/377 |
| 2005/0210856 A1 * | 9/2005 | Menichetti | 56/377 |

FOREIGN PATENT DOCUMENTS

EP 898874 A1 * 3/1999

* cited by examiner

*Primary Examiner* — Arpad Fabian-Kovacs
(74) *Attorney, Agent, or Firm* — George L. Williamson

(57) ABSTRACT

A hay rake having a central main frame member with left and right extendable spinner arms so that they swing toward and away from the main frame from a closed position for transportation to an open position for raking hay. Each spinner arm comprises at least one spinner disposed on its outer surface. Each spinner arm is attached to the main frame using a spinner arm knuckle-like joint which allows the spinner arm assemblies to move in both a horizontal and a vertical plane. Hay deflectors are attached under each spinner arm in front of the spinners to prevent wrapping of hay around rotating parts and to assist in moving tile hay toward the entrance of the baler.

20 Claims, 4 Drawing Sheets

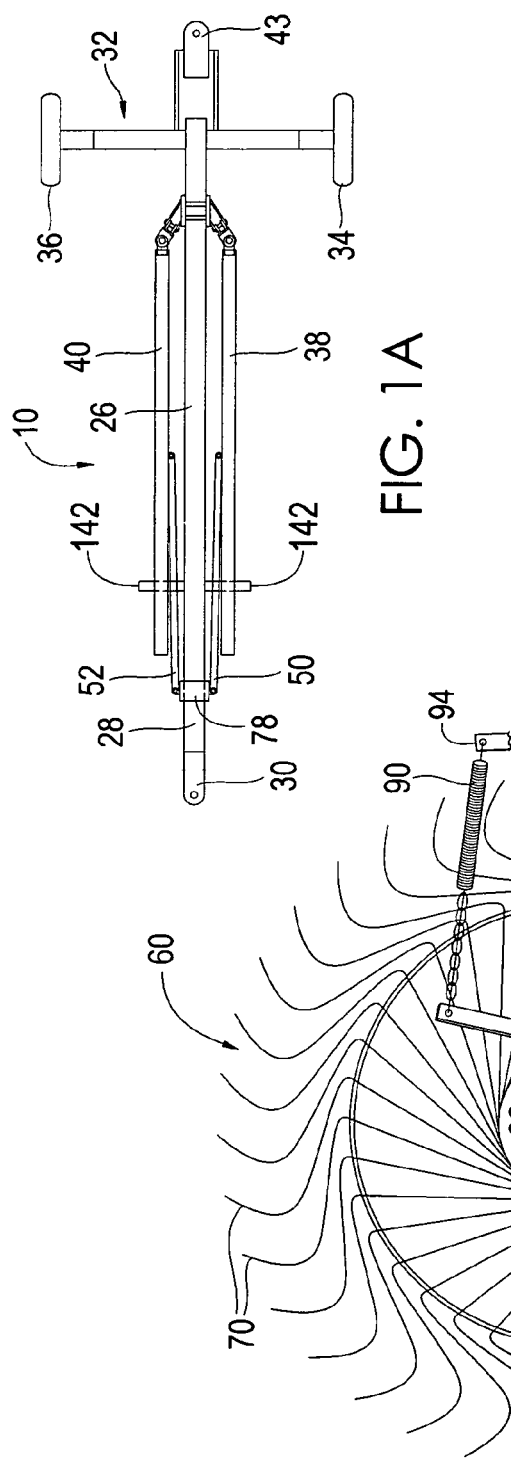
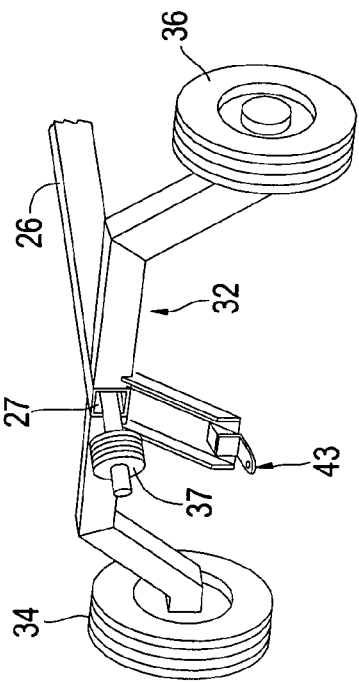

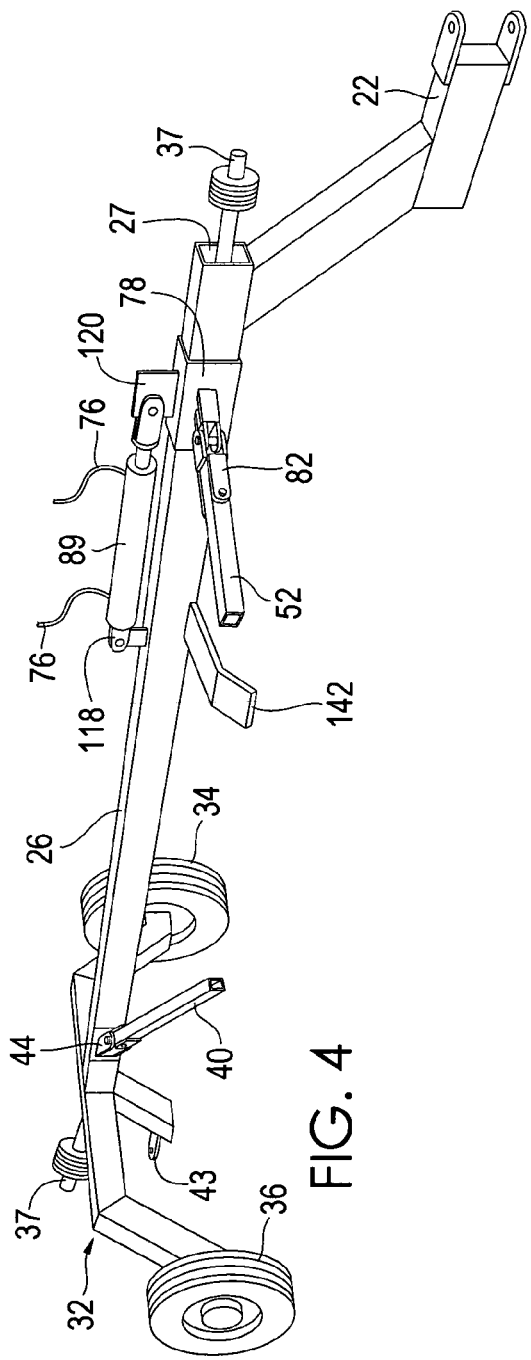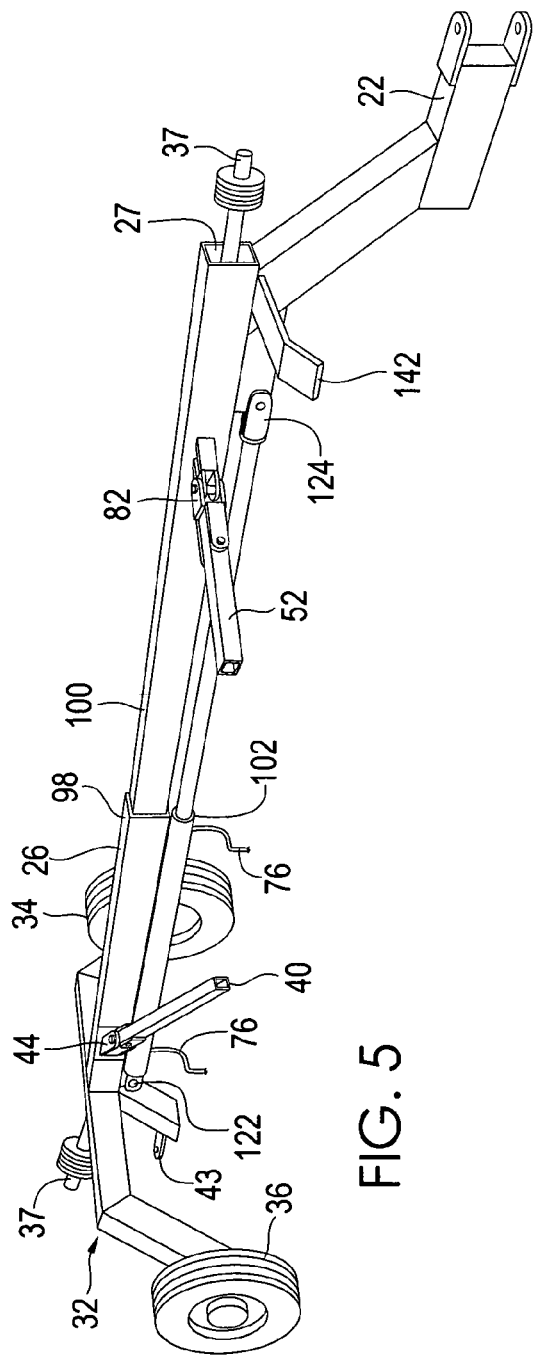

COMBINATION OF HAY RAKE AND BALER WITH HAY DEFLECTOR AND METHOD

BACKGROUND OF THE INVENTION

1. Field of the Invention

The present invention relates generally to farm implements, more particularly, is concerned with a hay rake having extendable arms thereon.

2. Description of the Related Art

Hay rakes have been described in the related art, however, none of the related art devices disclose the unique features of the present invention.

In U.S. Pat. No. 5,404,702 dated Apr. 11, 1995, Lewis described a retro-fittable wide windrow apparatus. In U.S. Pat. No. 5,685,135 dated Nov. 11, 1997, Menichetti described a pull type V-rake. In U.S. Pat. No. 7,318,312 dated Jan. 15, 2008, Cicci, et al., described an adjustable hay rake. In U.S. Pat. No. 7,100,351 dated Sep. 5, 2006, Rowse, et al., described a foldable hay rake. In U.S. Pat. No. 6,834,488 dated Dec. 28, 2004, Menichetti described a towable hay rake with an automatic steering mechanism. In U.S. Pat. No. 6,105,354 dated Aug. 22, 2000, Luhn, et al., described a rake apparatus. In U.S. Pat. No. 7,367,175 dated May 6, 2008, Scott disclosed a method and apparatus for a hay rake. In U.S. Patent Application Publication 2002/0059790 dated May 23, 2002, Paulsen disclosed a combined baler and rake apparatus.

While these hay rakes may be suitable for the purposes for which they were designed, they would not be as suitable for the purposes of the present invention as hereinafter described.

SUMMARY OF THE PRESENT INVENTION

The present invention discloses a hay rake which is designed to be used between a towing tractor and a baler being towed behind the hay rake. The hay rake of the present invention discloses a central main frame member having a hitch on its front end attached to the rear of the towing tractor and the rear of the main frame being attached to and supported by a rear wheel carrier assembly having ground contacting wheels on each side thereof and further having a draw bar on the rear end thereof to which the hay baler being towed is attached. Attached to either side of the main frame are first left and second right extendable spinner arm assemblies which are hydraulically operated so that they swing toward and away from the main frame from a first closed position for transportation to a second open position for raking hay. Each spinner arm assembly comprises a spinner arm having a plurality of spinner assemblies thereon which aid in picking up hay from the field and directing it into the entrance of the hay baler. Each of the left and right spinner arm assemblies are attached to the main frame using a spinner arm knuckle-like joint which allows the spinner arm assemblies to move in both a horizontal and a vertical plane so that the spinner arms can flex to maintain consistent contact with the ground. Furthermore, hay deflectors are attached under each spinner arm in front of the spinners to prevent wrapping of hay around rotating parts and to assist in moving the hay toward the entrance of the baler. It should be noted that the elevation of the spinners relative to the surface of the ground is hydraulically controlled by a hydraulic cylinder which operates the spinners, and, manually controlled by a manually adjustable spring provided on each spinner to control the elevation of the spinners relative to the surface of the ground. Furthermore, the spinners are located on the outer or rear trailing portion of the spinner arms so as to better direct hay into the entrance of the hay baler and to cause the width of the present invention in the stored position to be narrower.

An object of the present invention is to provide a hay rake for operation between a conventional tractor and a conventional hay baler which eliminates the need for a second operator or tractor which saves time, money and wear on equipment. An object of the present invention is to provide a main frame having a drive shaft contained therein in order to prevent the drive shaft from becoming wrapped in hay material. An object of the present invention is to provide a hay baler which is more efficient in its hay baling operation than the prior art. A further object of the present invention is to provide a hay baler which is easier to operate than the prior art because it maintains itself in a cleaner condition. A further object of the present invention is to provide a hay rake which is compatible with any inline hay baler whether it is a round baler or a square baler. A further object of the present invention is to provide a hay baler which closes up into a very narrow profile so that it is much easier and safer to transport on public highways. A further object of the present invention is to provide a hay baler which can be easily operated by a user of the present invention. A further object of the present invention is to provide a hay baler which can be relatively and inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 1A is a plan view of one embodiment of the present invention in the closed position.

FIG. 3 is a perspective view of a spinner assembly of the present invention.

FIG. 4 is a perspective view of one embodiment of the main frame of the present invention.

FIG. 5 is a perspective view of a second embodiment of the main frame of the present invention.

FIG. 6 is a perspective view of the rear end of the present invention.

LIST OF REFERENCE NUMERALS

Figure 1:
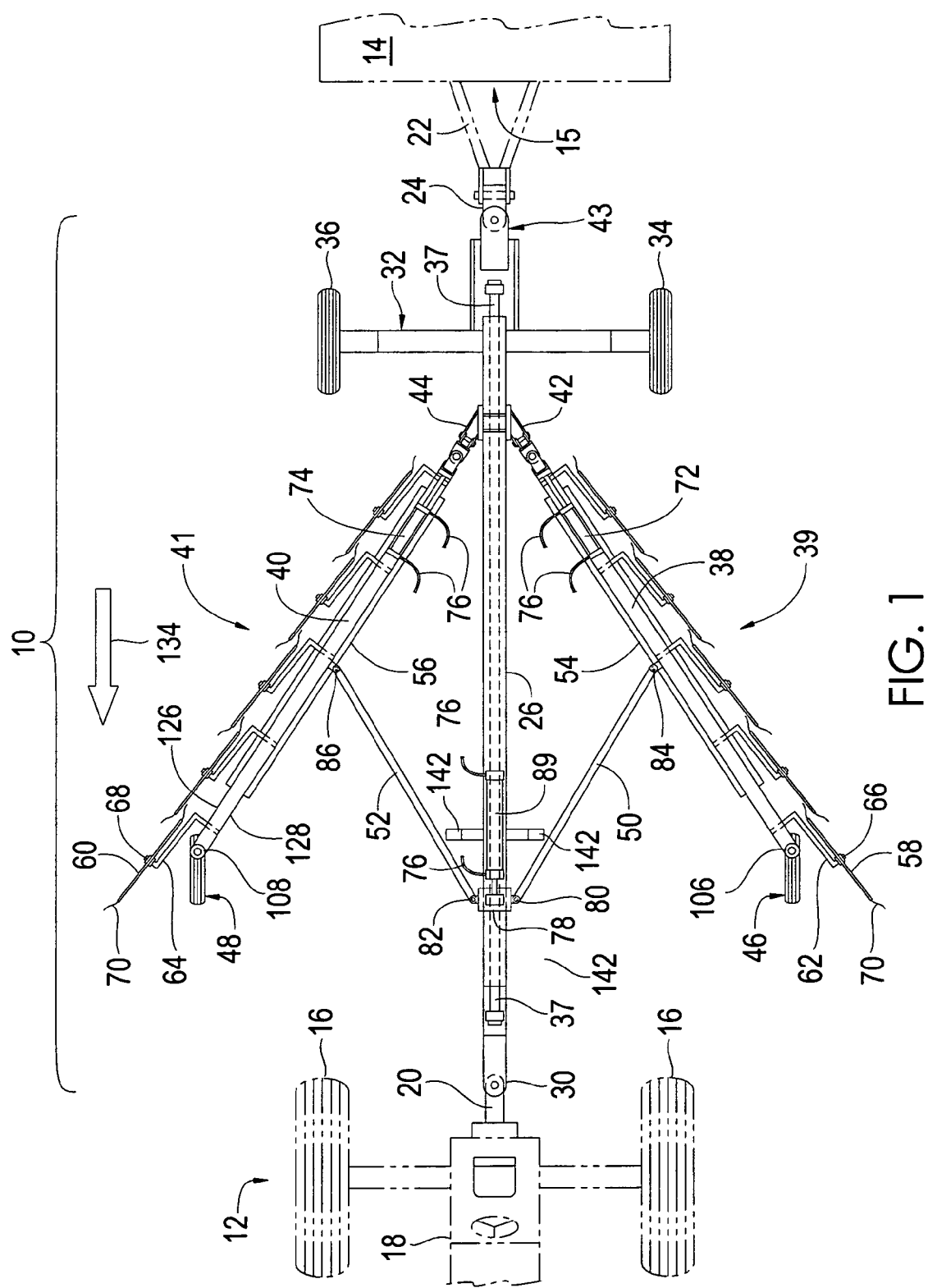
FIG. 1 is a plan view of one embodiment of the present invention in the open position.

With regard to reference numerals used, the following numbering is used throughout the drawings.

| | |
|---|---|
| 10 | present invention |
| 12 | tractor body |
| 14 | hay bailer |
| 15 | entrance |
| 16 | wheels |
| 18 | body |
| 20 | draw bar |
| 22 | tongue of hay bailer |
| 24 | hitch |
| 26 | main frame |
| 27 | bore/internal space |
| 28 | tongue |
| 30 | hitch |
| 32 | rear wheel carrier assembly |
| 34 | left wheel |
| 36 | right wheel |
| 37 | power take off (PTO) |
| 38 | left spinner arm |
| 39 | left spinner arm assembly |
| 40 | right spinner arm |
| 41 | right spinner arm assembly |
| 42 | left spinner arm knuckle-like joint |
| 43 | rear draw bar |
| 44 | right spinner arm knuckle-like joint |
| 45 | joint for vertical movement |
| 46 | left caster assembly |
| 47 | joint for horizontal movement |
| 48 | right caster assembly |
| 50 | left transfer arm |
| 52 | right transfer arm |
| 54 | left deflector |
| 56 | right deflector |
| 57 | support arm |
| 58 | left spinner |
| 60 | right spinner |
| 62 | left spinner cam |
| 64 | right spinner cam |
| 66 | left spinner hub |
| 68 | right spinner hub |
| 70 | tines |
| 72 | left cam lifter cylinder |
| 74 | right cam lifter cylinder |
| 76 | hydraulic line |
| 78 | shuttle/sleeve |
| 80 | left transfer arm knuckle connection |
| 82 | right transfer arm knuckle connection |
| 84 | left connection |
| 86 | right connection |
| 88 | cam lifter rod |
| 89 | hydraulic cylinder |
| 90 | adjustment spring |
| 92 | spinner cam arm |
| 94 | arm |
| 96 | receptacle/cam hub |
| 98 | female portion |
| 100 | male portion |
| 102 | hydraulic cylinder |
| 104 | surface of ground |
| 106 | left spring |
| 108 | right spring |
| 110 | collar |
| 112 | support leg |
| 114 | point of hydraulic cylinder |
| 116 | point of hydraulic cylinder |
| 118 | point of hydraulic cylinder |
| 120 | point of hydraulic cylinder |
| 122 | point of hydraulic cylinder |
| 124 | point of hydraulic cylinder |
| 126 | outer surface |
| 128 | inner surface |
| 130 | upper surface |
| 132 | lower surface |
| 134 | forward direction arrow |
| 136 | forward rotation direction arrow |
| 138 | hay |
| 140 | direction arrow |
| 142 | transport bracket |

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 6 illustrate the present invention wherein a hay baler is disclosed.

Turning to FIG. 1, therein is shown the present invention generally at 10 being towed behind a conventional tractor 12 having wheels 16, draw bar 20, tractor body 18 whereupon an operator would ride and which would house the tractor motor, and also a conventional power take off (PTO). Also included on conventional tractors 12 are multiple conventional hydraulic power points and electrical points and controls therefor which are used to operate any of a wide variety of equipment being used with and being towed behind a tractor. One skilled in the art would be knowledgeable of such power take offs, hydraulic and electrical assemblies and controls which are available on conventional tractors 12 and related equipment such as used with the present invention 10. Also shown is a conventional baler 14 having an entrance 15 where hay enters, a tongue 22 and hitch 24 which is connected to the rear draw bar 43 of the present invention 10. Shown therein is a centrally disposed main frame 26 having on its front end a tongue 28 along with hitch 30 for attachment to the rear draw bar 20 of tractor 12 along with a rear wheel carrier assembly 32 disposed on its rear end having left 34 and right 36 ground contacting wheels along with a rear draw bar 43 disposed thereon to which the hitch 24 of tongue 22 of the baler 14 is attached. Also shown generally are left and right spinner arm assemblies 39, 41 having left and right spinner arms 38, 40. Each spinner arm 38, 40 has an outer 126 and inner 128 surface and is attached at its rear end to the main frame 26 using left and right 42, 44 spinner arm knuckle-like joints which allow movement of the spinner arm in two planes being both the horizontal and vertical plane to allow arms 38, 40 to flex to assure close and consistent contact with the surface of the ground. Also shown on the distal end of each spinner arm 38, 40 is a left and right caster assembly, 46, 48 which allows the spinner arms to be supported as the caster assemblies contact and roll along the surface of the ground. Also shown are left and right transfer arms 50, 52 along with a left and right deflectors 54, 56. The deflectors 54, 56 are disposed underneath the arm 38, 40 in front of the spinners 58, 60 so as to deflect the raked hay (not shown, see item 138 on FIG. 2) downwardly so as to keep the rake clean and to prevent material from being wrapped around the spinners and any other rotating parts along with assisting in directing the hay into the inlet of the baler 14. Deflectors 54, 56 are effectively shaped and sized in length and width to prevent hay and other material from being wrapped around the spinners 58, 60 and are for illustration purposes shown here as being rectangular shaped. However, it is to be expected that some experimentation may be required by one skilled in the art to optimally size and space the deflectors 54, 56 according to the size of the present invention 10 being used and according to the type of material or hay being raked. Each spinner arm 38, 40 has at least one left and right spinner 58, 60 disposed thereon and may have up to five or six spinners or more disposed thereon depending on the length of the spinner arm. Also shown are left and right spinner cams, 62, 64 along with the left and right spinner hubs 66, 68 upon which the spinners rotate along with tines 70 on each spinner. Also shown are left and right cam lifter cylinders 72, 74 being hydraulic cylinders having hydraulic lines 76 for operation thereon. Shuttle or sleeve 78 is shown on the main frame 26 having the left and right transfer arms 50, 52 connected thereto with the left and right transfer arm knuckle connection 80, 82 on one end along with left and right connections 84, 86 on the other end connecting the transfer arms 50, 52 to the left and right spinner arms 38, 40 wherein the transfer arms 50, 52 move in response to movement of sleeve 78 by hydraulic cylinder 88 so as to move the spinner arms 38, 40 between a first closed position and a second open position which open position is illustrated in FIG. 1. Power take-off shaft 37 is also shown. It would be understood by one skilled in the art that the present invention 10 comprises numerous components configured for operation on opposite sides, i.e., left and right sides, of the present invention 10. For example, a left spinner arm assembly 39 (as shown in FIG. 1) would be similar to right spinner arm assembly 41 but configured for use and operation on the left side of the present invention 10. Direction arrow 134 indicates the forward direction of the present invention 10. The arms 38, 40 also ride up on the frame on transport arm 142, off of the ground, and out of the way when in transport position.

Turning to FIG. 1A, therein is shown a stripped down version of the present invention 10 in a closed position showing the main frame 26, left 38 and right 40 spinner arm, left 50 and right 52 transfer arm, sleeve 78, tongue 28, hitch 30, rear wheel carrier assembly 32, left 34 and right 36 wheel and draw bar 43 and transport arm 142.

Figure 2:
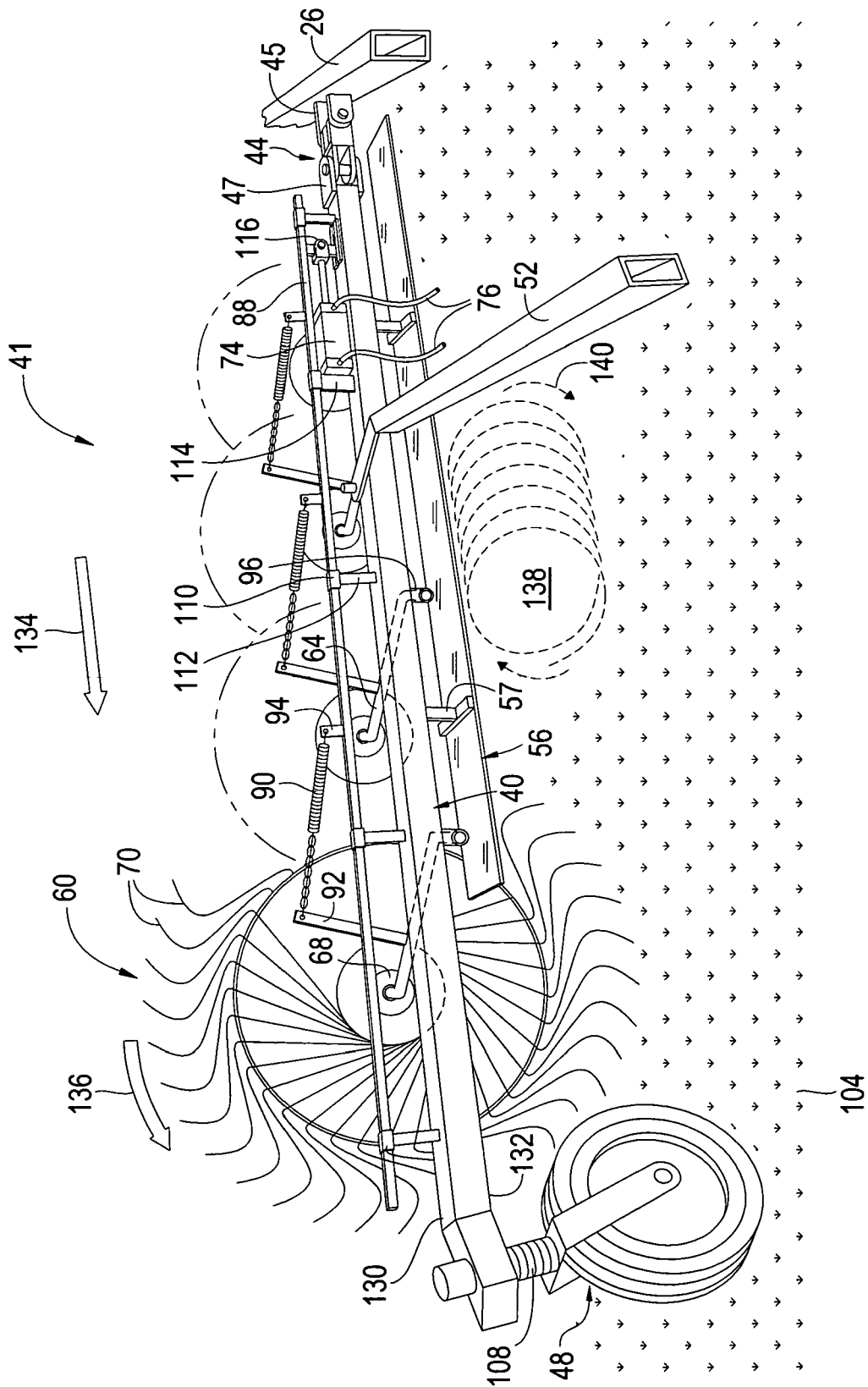
FIG. 2 is a perspective view of a spinner arm assembly of the present invention.

Turning to FIG. 2, therein is shown a perspective view of a typical right spinner arm assembly 41. Only the right spinner arm assembly 41 is shown in FIG. 2, but it would be understood by one skilled in the art that the components of a left spinner arm assembly 39 (as shown in FIG. 1) would be similar to the components of spinner arm assembly 41 but configured for use and operation on the left side of the present invention 10 and that he description of the right side component would be equally applicable as a description of the left side component. Spinner arm assembly 41 comprises right spinner arm 40 having an upper 130 and lower 132 surface and having a plurality of right spinners 60 thereon wherein the arm 40 is connected to the main frame 26 with a spinner arm knuckle-like joint 44 on one end having a ground surface 104 contacting caster assembly 48 equipped with spring 108 on the other end of the arm 40 for support. Knuckle-like joint 44 has a first portion 45 allowing movement in the vertical plane and a second portion 47 allowing movement in the horizontal plane. Each spinner 60 is mounted on a spinner hub 68 about which it rotates wherein the adjustment spring 90 has one end attached to a longer spinner cam arm 92 and the other end attaches to a shorter arm 94 which is disposed on a cam lifter rod 88 which is operated by the hydraulic cam lifter cylinder 74 acting between points 114 which is fixed and 116 which is attached to sliding rod 88 wherein cylinder 74 is also connected to and operated by hydraulic lines 76. Cam lifter rod 88 is an elongated rod running parallel above spinner arm 40 which rod 88 is slidably disposed in a plurality of collars 110 which are disposed on an upper end of a plurality of support legs 112 being spaced apart along the upper surface of spinner arm 40. Receptacle or cam hub 96 is also shown disposed underneath spinner arm 40 for rotatably receiving an end of spinner cam 64. The spinner arms 38, 40 are moved from a first closed position to a second open position and therein between by a transfer arm 52 having one end connected to the main frame 26 and the other end connected to the spinner arm 40 at right connection 86. Also shown underneath the spinner arm 40 is a deflector 56 as previously described wherein the deflector is spaced apart an effective distance from the spinner arm by multiple support arms 57. Of course, there may be other ways to support the deflector 56 below the spinner arm 40. It can be seen that when hydraulic cam lifter cylinder 74 shortens or lengthens the distance between points 114 and 116 that cam lifter rod 88 moves toward the front (distance between points 114 and 116 shortened) or rear and that the spinners 60 are lowered or raised in response thereto so that the operator can maintain the spinners in close and effective contact with the ground 104. Also, multiple manually adjustable springs are provided on the spinner arm assembly 41 to control the elevation of the spinners 60 relative to the surface 104 of the ground. Furthermore, the spinners 60 are located on the outer or rear trailing portion of the spinner arm 40 so as to better direct hay 138 into the entrance of the hay baler 14 and to allow for a narrower profile when the present invention 10 is in a closed position. Direction arrow 136 shows forward rotation of spinner 60 when the present invention 10 moves forward and direction arrow 140 shows rotation of hay 138.

Turning to FIG. 3, therein is shown a typical spinner 60. Only the right spinner 60 assembly shown in FIG. 3 but it would be understood by one skilled in the art that the components of a left spinner assembly 58 (as shown in FIG. 1) would be similar to spinner assembly 60 but configured for use and operation on the left side of the present invention 10 and that he description of the right side component would be equally applicable as a description of the left side component. Spinner 60 rotates about a spinner hub 68 on one end of a spinner cam 64 having a manually operated adjustment spring 90 for attachment to a spinner cam arm 92 and second arm 94 to allow adjustment of the spinner relative to the ground surface 104 to maintain consistent and effective contact with the surface 104 of the ground. The spinners 60 have a plurality of tines 70 thereon and the spinner cam 64 has one end rotatable mounted into a receptacle 96 (see FIG. 2) disposed underneath the spinner arm 40. The tips of tines 70 are caused to manually rotate by contacting the surface 104 of the ground as the present invention 10 is pulled along the ground surface. The spinners 60 are also hydraulically lifted and adjusted by cam lifter rod 88 (see FIG. 2) as previously explained.

Turning to FIGS. 4 and 5, shown therein are alternative embodiments for moving spinner arms 38, 40 between their open and closed positions; in each case spinner arms 38, 40 move in response to the transfer arms 50, 52 (see FIG. 1) being moved in response to a hydraulically operated component as will be further explained hereinafter. Turning to FIG. 4, therein is shown one embodiment of the main frame 26 having tongue 22 on its front end along with the rear wheel carrier assembly 32 on its rear having wheels left and right 34, 36 along with a rear draw bar 43 having a power take off 37 thereon. Also shown is sleeve or shuttle 78 which surrounds and slides along the outside of the main frame 26 in cooperation with and in response to the hydraulic cylinder 89 acting between points 118 which is fixed and 120 which is attached to sliding sleeve 78 wherein cylinder 89 is also connected to and operated by hydraulic lines 76. Also shown is a right spinner arm 40 and a right transfer arm 52 wherein the rear end of spinner arm 40 is connected to the main frame with joint 44 and the transfer arm 52 is connected to the sleeve 78 of the main frame 26 at joint 82 so that when sleeve 78 moves toward the front (due to distance between points 118 and 120 being lengthened by cylinder 89) or rear that the transfer arm 52 opens or closes spinner arm 40 as the distance between points 118 and 120 is shortened or lengthened. Note that in this embodiment the sleeve 78 has a travel distance of approximately 24 inches plus or minus to open and close the spinner arm 40. Of course, one skilled in the art would understand that the components of the left side of the present invention 10 (see FIG. 1) would be configured and operated in a similar manner. The main frame 26 has bore or internal space 27 through which PTO shaft 37 extends so that the PTO shaft is protected from becoming wrapped with hay or other debris. Also shown is transport arm 142.

Turning to FIG. 5, therein is shown a second alternative of the main frame 26 having similar components as previously disclosed in FIG. 4. However, this embodiment differs from the embodiment of FIG. 4 in that the main frame 26 operates telescopically comprising a female portion 98 along with a male portion 100 wherein the male portion 100 is operated by and in response to a hydraulic cylinder 102 acting between points 122 which is fixed and 124 which is attached to sliding male portion 100 wherein cylinder 102 is also connected to and operated by hydraulic lines 76 which cylinder 102 has a travel distance of approximately 72 inches plus or minus wherein the right spinner arm 40 is opened and closed as the distance between points 122 and 124 is shortened or lengthened. Transfer arm 52 is connected to male portion 100 of the main frame 26 at joint 82 so that when sleeve male portion 100 moves toward the front or rear that the transfer arm 52 opens or closes spinner arm 40. Otherwise, the embodiment shown in FIG. 5 is similar to the embodiment shown in FIG. 4. Of course, one skilled in the art would understand that the components of the left side of the present invention 10 (see FIG. 1) would be configured and operated in a similar manner. Also shown is transport arm 142.

Turning to FIG. 6, therein is shown the rear end of the present invention 10 having a rear wheel carrier assembly 32 having left and rights wheels 34, 36 conventionally mounted thereon wherein a rear draw bar 43 is shown along with the PTO shaft 38 and portions of the main frame 26 having bore or space 27 therein.

By way of summary and with reference to FIGS. 1-6, the following additional description is presented. 1) The rake of the present invention 10 is designed for use between the tractor 12 and the baler 14. Conventional rakes are designed to be used "stand alone," which requires a second tractor and operator in the field. The present invention 10 eliminates the need for a second operator or tractor, which saves much time, money and wear on equipment. 2) The PTO drive shaft 37 is enclosed in the interior space 27 of main frame 26 of the present invention 10 so that the PTO drive shaft 37 between the tractor 12 and the baler 14 is disposed inside of the main frame 26 of the rake. There are no PTO driven parts on the rake. This allows safe operation of the baler 14 behind the rake of the present invention 10. 3) The present invention 10 has left and right spinner arms 38, 40 which move inwardly and outwardly, hydraulically, for ease of use, precise hay gathering, and transport of the implement. The arms 38, 40 also ride up on the frame on transport arm 142, off of the ground, and out of the way when in transport position. The distal ends of the arms 38, 40 are supported by gauge wheels 46, 48, while in operation, which are equipped with shock absorbing springs 106, 108 to lessen the stress on the main frame 26 and arms 38, 40 and other components while operating on uneven terrain. 4) The arms 38, 40 of the present invention 10 flex and move to maintain more consistent, effective contact with the ground 104. This is accomplished through a pinned joint 42, 44 where the arms 38, 40 attach to the main frame 26. This joint 42, 44 is vaguely inspired by a "universal joint." 5) An adjustable spring tension system 90 on the arms 38, 40 allow the operator to set the machine's rake spinners 60 to rake lightly in order to rake hay in a cultivated peanut field or alfalfa field, for example, or more aggressively in a coastal Bermuda grass field or other more hearty material. 6) The rake spinners 60 are set at a lesser angle and closer spacing than conventional rakes. This allows for more efficient and gentle gathering of the hay product (i.e., clover or alfalfa), while also extending the operational life of the spinners 60 themselves. 7) A major innovation that is not found in the related art is that of hay deflectors 54, 56. Hay deflectors 54, 56 installed along the wings, in front of the rake spinners 60, keep the rakes cleaned out, prevents "wrapping" of the spinners, and keeps hay moving toward the baler 14. 8) The proximity of the baler 14 to the rake of the present invention 10 allows for the more efficient bailing of the gathered hay product, virtually eliminating waste. The rake of the present invention 10 is extremely efficient and, when paired with a suitable baler 14, will pick up practically all of the cut hay and bail it in one pass. Further, since the hay is bailed immediately after raking, there is practically no loss of product to settling, wind, or adverse weather. 9) The rake of the present invention 10 is compatible with any in-line baler 14 (round or square).

The operation and use of the present invention 10 is relatively straight forward. Initially, assuming that the instant invention 10 has been properly mounted between a tractor 12 and a baler 14, that the spinner arms 38, 40 are in the transportation or stored position and that a user wishes to operate the equipment, the user would make all necessary electrical, hydraulic or mechanical power take off point connections in order to operate and control the present invention 10.

If not already located at the hay field, the present invention 10 would be towed to the hay field in which it is to function by being conventionally coupled behind a towing vehicle or tractor. At the field, the present invention 10 would be connected between the tongue of the baler 14 and the draw bar of a tractor 12. The present invention 10 is made ready for raking by opening the spinner arm assemblies 39, 41, adjusting the gauge wheels 46, 48 as necessary, and adjusting the height and position of the spinners 60 as necessary to an effective height as selected by a user.

Generally, the hay in the field is aligned into a plurality of windrows which are substantially parallel so that the rake in this invention 10 can gather the previously cut hay from a plurality of windrows into a single windrow suitable for entrance into the entrance of the hay baler 14. Thus, it is expected that the operator of a tractor 12 aligns the present invention 10 in a direction where the operator expects to make a pass over the windrows of the hay field in a conventional fashion as would be understood by one skilled in the art. In summary, The operator is now ready to begin hay raking of a field. The operator should carefully track around the field making certain that the extended arms 38, 40 do not come in contact with improper objects in the field. Each pass should slightly overlap the previous pass in order to assure collection of all the cut hay. Generally speaking, all controls for the baler 14 and the present invention 10 would be located on the tractor 12. The operator would adjust the baler 14 controls as per the baler's instruction manual. When one first arrives at the field the device 10 is driven from a public highway onto the field and set up as previously explained. The arms 38, 40 of the present invention 10 would be extended as appropriate for the individual field. Once the hay raking of the field is completed, it is expected that the rake of the present invention 10 should be returned to the transportation/storage position for transportation to another field or left in the current field for continued use at a later time.

I claim:

1. A hay rake, the hay rake for being towed behind a tractor, the hay rake for towing a baler, comprising:
   a) a main frame having front and rear ends and left and right sides, said front end being connected behind the tractor and said rear end being connected to the baler, and a ground contacting rear wheel assembly disposed on said rear end;
   b) left and right spinner arms fastened to said left and right sides, respectively, of said main frame, each said spinner arm having front and rear ends, upper and lower surfaces, and inner and outer surfaces, wherein each said rear end is connected to said main frame so that each spinner arm front end is movable horizontally back and forth between a closed position and an open position;
   c) at least one spinner being rotatably mounted on said outer surface of each said left and right spinner arm;
   d) a hay deflector attached to and disposed below said lower surface of each said left and right spinner arm to deflect hay downwardly to prevent hay from being caught in rotating components of the hay rake; and
   e) left and right transfer arms each having first and second ends, wherein said first end of each said transfer rod is disposed on said main frame and said second end of each said transfer rod is connected to said corresponding left or right spinner arm, wherein said left and right spinner arm is moved back and forth between said closed position and said open position in response to movement of said first end of each said transfer rod, and whereby said hay deflector under each spinner arm moves along with each spinner arm between open and closed positions.

2. The hay rake of claim 1, wherein said hay deflectors are effectively sized to extend along each said left and right spinner arm for an effective portion of the length of said left and right spinner arm to permit hay to be deflected downwardly to prevent hay from being caught in rotating parts of the hay rake.

3. The hay rake of claim 2, further comprising a knuckle-like joint connecting said rear end of each said left and right spinner arm to said main frame, wherein said knuckle-like joint pivots in both a horizontal plane and a vertical plane.

4. The hay rake of claim 3, wherein said main frame has an internal space therein extending from said front end to said rear end, wherein a power take off shaft extends through said internal space from said front end to said rear end of said main frame to protect said shaft from debris.

5. The hay rake of claim 4, wherein each said spinner is adapted to be hydraulically raised or lowered relative to the surface of the ground.

6. The hay rake of claim 5, further comprising an adjustment spring disposed on each said spinner, wherein said spinner is adapted to be manually raised or lowered relative to the surface of the ground.

7. The hay rake of claim 6, in which each hay deflector comprises an extended flat plate in a horizontal orientation paralleling each transfer arm.

8. The hay rake of claim 6, further comprising a sleeve, said sleeve being slidably disposed about said main frame, wherein said first end of each said transfer rod is connected to said sleeve, wherein said sleeve moves in response to a hydraulic cylinder to move said left and right spinner arms back and forth between said closed position and said open position.

9. The hay rake of claim 6, wherein said main frame comprises male and female portions, wherein said male and female portions are telescopically joined together, wherein said first end of each said transfer rod is connected to said male portion, wherein said male portion moves in response to a hydraulic cylinder to move said left and right spinner arms back and forth between said closed position and said open position.

10. The hay rake of claim 6, further comprising left and right caster assemblies disposed on each said front end of each said corresponding left and right spinner arm, wherein each said left and right caster assembly comprises a spring which is individually adjustable.

11. A method for making a hay rake, the hay rake for being towed behind a tractor, the hay rake for towing a baler, comprising the steps of:
    a) providing a main frame having front and rear ends and left and right sides, the front end adapted to be connected behind the tractor and the rear end adapted to be connected to the baler, and the rear end being supported by a ground contacting rear wheel assembly;
    b) providing left and right spinner arms fastened to the left and right sides, respectively, of the main frame, each spinner arm having front and rear ends, upper and lower surfaces, and inner and outer surfaces, wherein each rear end is connected to the main frame so that each spinner arm front end moves horizontally back and forth between a closed position and an open position;
    c) providing at least one rotatably mounted spinner on the outer surface of each left and right spinner arm;
    d) providing a hay deflector attached to and below each left and right spinner arm to deflect hay downwardly to prevent hay from being caught in rotating components of the hay rake; and
    e) providing left and right transfer arms each having first and second ends, wherein said first end of each said transfer rod is disposed on said main frame and said second end of each said transfer rod is connected to said corresponding left or right spinner arm, wherein said left and right spinner arm is moved back and forth between said closed position and said open position in response to movement of said first end of each said transfer rod, and whereby said hay deflector under each spinner arm moves along with each spinner arm between open and closed positions.

12. The method of claim 11, wherein the hay deflectors are effectively sized to extend along each left and right spinner arm for an effective portion of the length of the left and right spinner arm to deflect hay downwardly to prevent hay from being caught in rotating components of the hay rake.

13. The method of claim 12, further comprising the step of providing a knuckle-like joint connecting the rear of each left and right spinner arm to the main frame, wherein the knuckle-like joint pivots in both a horizontal plane and a vertical plane.

14. The method of claim 13, wherein the main frame has an internal space therein extending from the front end to the rear end, wherein a power take off shaft extends through the internal space from the front end to the rear end of the main frame to protect the shaft from debris.

15. The method of claim 14, wherein each spinner is hydraulically raised or lowered relative to the surface of the ground.

16. The method of claim 15, further comprising the step of providing an adjustment spring disposed on each spinner, wherein the spinner is raised or lowered relative to the surface of the ground.

17. The method of claim 16, in which each hay deflector comprises an extended flat plate in a horizontal orientation paralleling each transfer arm.

18. The method of claim 16, further comprising the step of providing a sleeve, the sleeve being slidably disposed about the main frame, wherein the first end of each transfer rod is connected to the sleeve, wherein the sleeve moves in response to a hydraulic cylinder to move the left and right spinner arms back and forth between the closed position and the open position.

19. The method of claim 16, wherein the main frame comprises male and female portions, wherein the male and female portions are telescopically joined together, wherein the first end of each transfer rod is connected to the male portion, wherein the male portion moves in response to a hydraulic cylinder to move the left and right spinner arms back and forth between the closed position and the open position.

20. The method or claim 16, further comprising the step of providing left and right caster assemblies disposed on each front end of each corresponding left and right spinner arm, wherein each left and right caster assembly has a spring which is individually adjustable.

\* \* \* \* \*